United States Patent
Wydock et al.

(10) Patent No.: US 12,486,020 B2
(45) Date of Patent: Dec. 2, 2025

(54) LEADING-EDGE DROOP ACTUATION SYSTEM

(71) Applicant: THE BOEING COMPANY, Arlington, VA (US)

(72) Inventors: Kyle Steven Wydock, Everett, WA (US); Ramón Burin, Lake Stevens, WA (US); John A. Standley, Seattle, WA (US); Mark Steven Good, Seattle, WA (US); Samuel Block, Bothell, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/533,603

(22) Filed: Dec. 8, 2023

(65) Prior Publication Data

US 2025/0187718 A1    Jun. 12, 2025

(51) Int. Cl.
*B64C 9/34* (2006.01)
*B64C 3/50* (2006.01)
*B64C 9/14* (2006.01)
*B64C 13/36* (2006.01)

(52) U.S. Cl.
CPC .............. *B64C 9/34* (2013.01); *B64C 13/36* (2013.01); *B64C 3/50* (2013.01); *B64C 2009/143* (2013.01)

(58) Field of Classification Search
CPC ........ B64C 9/34; B64C 5/12; B64C 2009/143
See application file for complete search history.

(56) References Cited

U.S. PATENT DOCUMENTS

| | | | |
|---|---|---|---|
| 4,285,482 A * | 8/1981 | Lewis | B64C 9/24 244/210 |
| 4,445,655 A * | 5/1984 | Hueberger | B64C 9/24 244/210 |
| 4,470,569 A * | 9/1984 | Shaffer | B64C 9/22 244/214 |
| 5,056,741 A * | 10/1991 | Bliesner | B64C 9/24 244/210 |
| 5,836,550 A | 11/1998 | Paez | |
| 11,433,988 B2 | 9/2022 | Godfroid | |
| 2010/0187368 A1 | 7/2010 | Cathelain et al. | |
| 2025/0083801 A1 | 3/2025 | Kamila et al. | |

FOREIGN PATENT DOCUMENTS

| | | |
|---|---|---|
| DE | 1756515 A1 | 10/1970 |
| EP | 0909705 A2 | 4/1999 |

OTHER PUBLICATIONS

Campbell-Brennan, Jahee, "Rising Rate Suspension: A Design Guide," Mar. 7, 2022, https://www.waveydynamics.com/post/rising-rate-suspension, pp. 1-10.
Extended European Search Report for application No. 24191530.5 dated Jan. 29, 2025, pp. 1-3.
Extended European Search Report for application No. 24215049.8 dated Mar. 20, 2025, pp. 1-7.

* cited by examiner

Primary Examiner — Ashesh Dangol
(74) Attorney, Agent, or Firm — Moore IP Law (57) ABSTRACT

An aircraft includes a wing and a leading-edge aerodynamic surface coupled to the wing. An actuator is disposed within the wing and coupled to the leading-edge aerodynamic surface via a linkage system. Two or more hinge systems are coupled to the leading-edge aerodynamic surface and configured to rotate about a fixed axis internal to the wing to move the leading-edge aerodynamic surface between a retracted position and a drooped position.

20 Claims, 6 Drawing Sheets

LEADING-EDGE DROOP ACTUATION SYSTEM

GOVERNMENT INTEREST STATEMENT

This invention was made with government support under 80AFRC22N0008 awarded by the National Aeronautics and Space Administration (NASA). The government has certain rights in the invention.

FIELD OF THE DISCLOSURE

The present disclosure is generally related to a device on a leading edge of aircraft wings designed to improve airflow at high angles of attack to prevent stalling.

BACKGROUND

Deployable leading-edge devices have been used for many years to control the lift/drag characteristics of an aircraft. In particular, conventional leading-edge devices (e.g., leading edge slats) are deployed for landing and take-off, and then stowed at cruise conditions. One drawback associated with many conventional leading-edge devices is that the actuators that power these devices tend to be large so as to overcome the aerodynamic forces acting against the devices as the devices are deployed into the adjacent airstream. Large actuators are difficult to integrate into the aircraft, and the weight of such actuators reduces the efficiency of the aircraft. In addition, large actuators consume a significant amount of power and can accordingly further reduce the efficiency of the aircraft. Accordingly, there is a need for deployable aerodynamic devices that consumes less of the available space within the wing and/or more efficient than conventional devices.

SUMMARY

In a particular implementation, an aircraft includes a wing and a leading-edge aerodynamic surface coupled to the wing. An actuator is disposed within the wing and coupled to the leading-edge aerodynamic surface via a linkage system. Two or more hinge systems are coupled to the leading-edge aerodynamic surface and configured to rotate about a fixed axis internal to the wing to move the leading-edge aerodynamic surface between a retracted position and a drooped position.

In another particular implementation, a leading-edge droop actuation system includes an actuator configured to be disposed within a wing of an aircraft. The actuator is configured to be coupled to a leading-edge aerodynamic surface of the aircraft via a linkage system. Two or more hinge systems are configured to be coupled to the leading-edge aerodynamic surface to enable rotation about a fixed axis internal to the wing to move the leading-edge aerodynamic surface between a retracted position and a drooped position.

In another particular implementation, a leading-edge droop actuation system includes a leading-edge aerodynamic surface. An actuator is coupled to the leading-edge aerodynamic surface and configured to be disposed within a wing in an orientation that provides linear motion in a direction along a length of the wing. A linkage system is coupled to the actuator, the linkage system includes a bell crank and one or more links coupled to the actuator and to the leading-edge aerodynamic surface. Two or more hinge arms are coupled to the leading-edge aerodynamic surface and configured to be coupled to pivot points of the wing to enable rotation about a fixed axis internal to the wing to move the leading-edge aerodynamic surface between a retracted position and a drooped position.

The features, functions, and advantages described herein can be achieved independently in various implementations or may be combined in yet other implementations, further details of which can be found with reference to the following description and drawings.

BRIEF DESCRIPTION OF THE DRAWINGS

FIGS. 1A and 1B are diagrams that illustrate a top view of an aircraft showing locations for leading-edge droop actuation systems and a particular implementation of a leading-edge droop actuation system.

FIG. 2 is a diagram that illustrates a side view of one or more components of the leading-edge droop actuation system.

FIG. 3 is a diagram that illustrates a top view of one or more components of the leading-edge droop actuation system.

FIG. 4 is a flowchart illustrating an example of a life cycle of an aircraft that includes the leading-edge droop actuation system of FIGS. 1A and 1B.

FIG. 5 is a block diagram illustrating aspects of an illustrative aircraft that includes a leading-edge droop actuation system of FIGS. 1A and 1B in accordance with an embodiment.

DETAILED DESCRIPTION

Aspects disclosed herein present a leading-edge droop actuation system that is small and lightweight (e.g., relative to conventional leading-edge actuation systems). Due to the small size of the disclosed leading-edge droop actuation system, the disclosed leading-edge droop actuation system consumes less of the available space within the wing, which may enable use of a smaller wing and/or may leave more space available for other systems.

Described in this disclosure are techniques and systems for a leading-edge droop actuation system that includes an actuator coupled to a leading-edge aerodynamic surface. The actuator is configured to be disposed within a wing in an orientation that provides linear motion in a direction along a length of the wing. The leading-edge droop actuation system also includes a linkage system that is coupled to the actuator. The linkage system includes a bell crank and one or more links coupled to the actuator and to the leading-edge aerodynamic surface. Two or more hinge arms are coupled to the leading-edge aerodynamic surface and configured to be coupled to pivot points of the wing to enable rotation about a fixed axis internal to the wing to move the leading-edge aerodynamic surface between a retracted position and a drooped position.

By using the techniques and systems described herein, the leading-edge droop actuation system has the technical advantages of improving airflow at high angles of attack to prevent stalling. In addition, the leading-edge droop actuation system has the technical advantages of providing additional integration space for wing and propulsion system routing within the wing.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number.

Figure 1A:
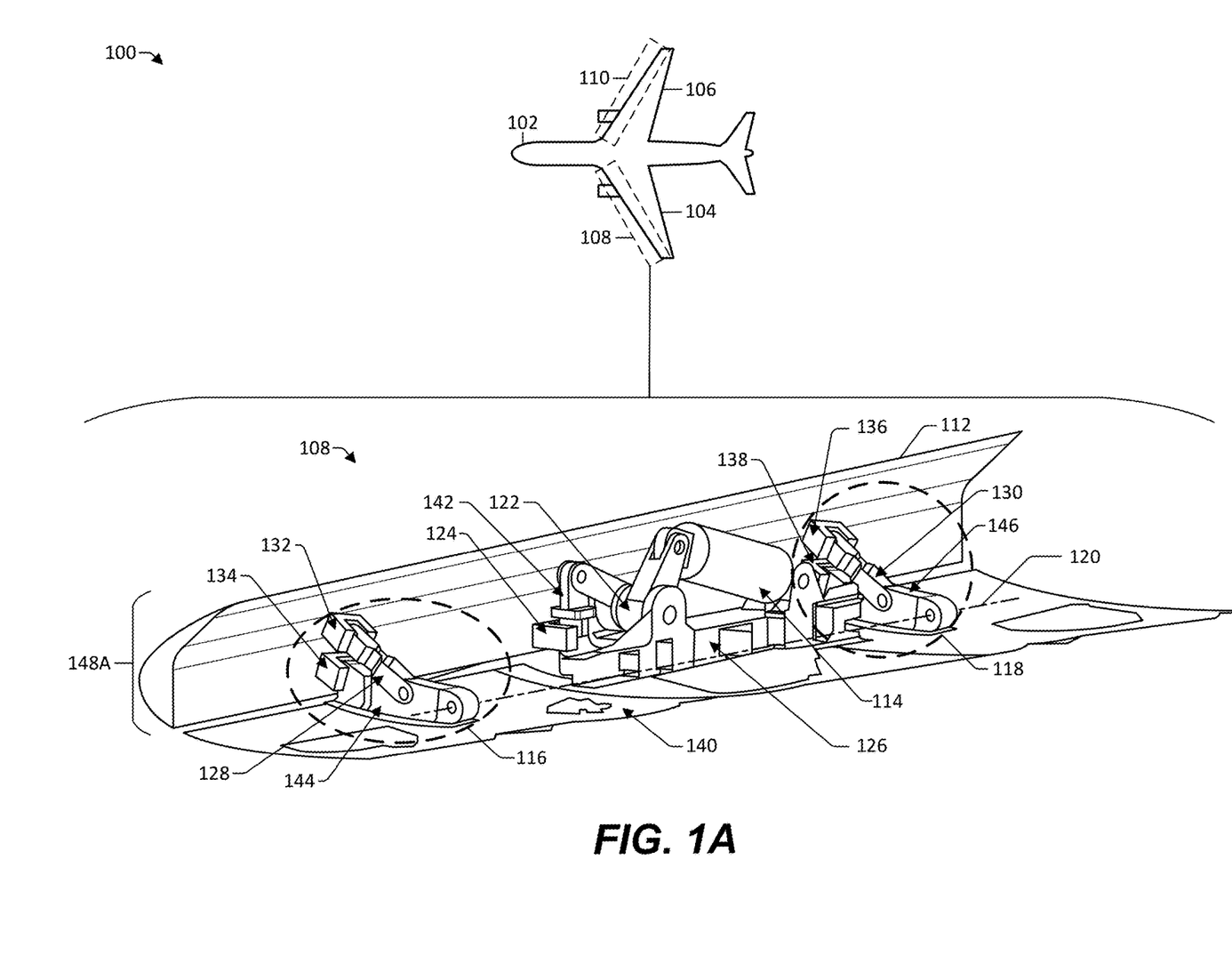
Figure 1B:
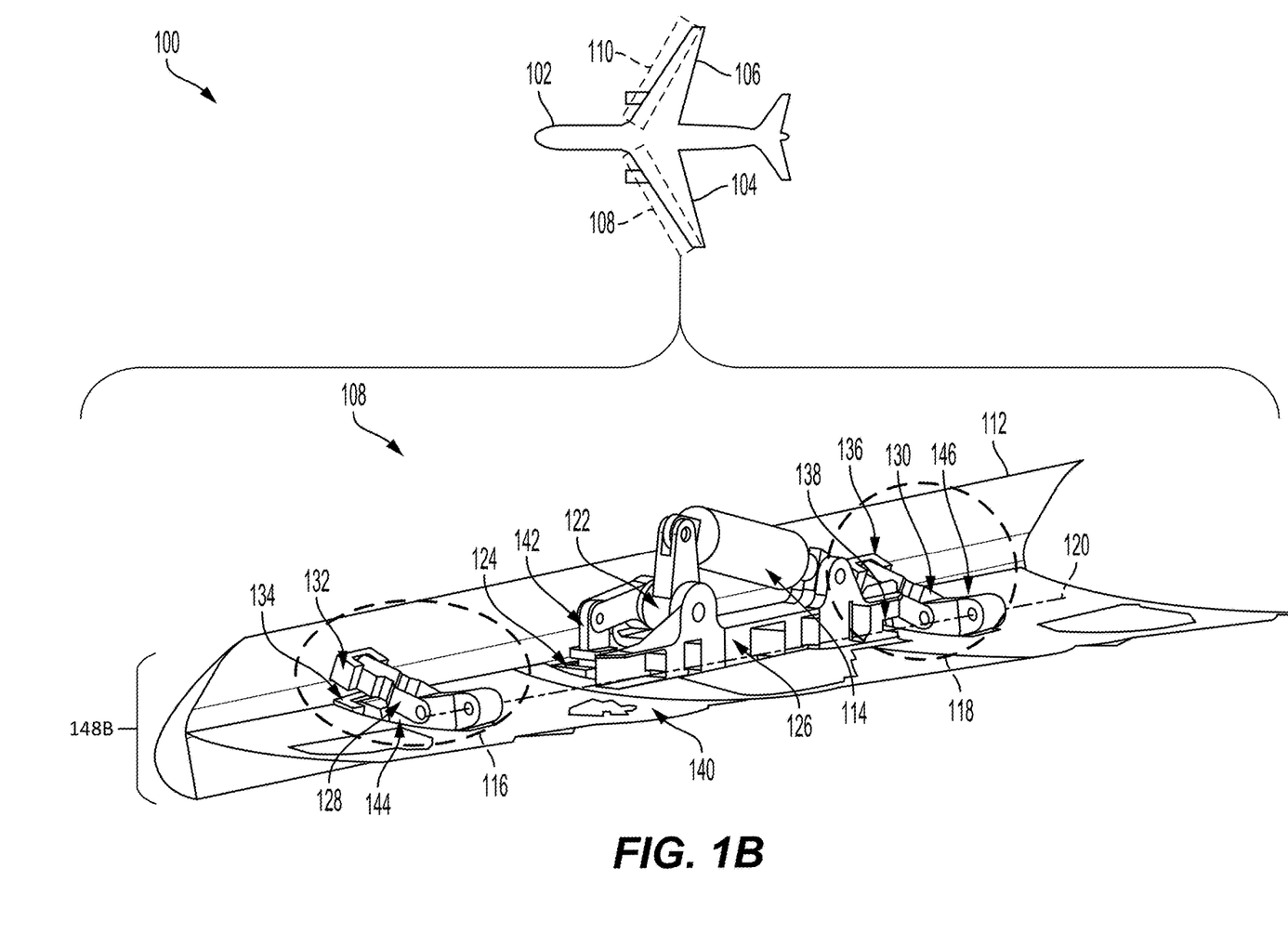

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIGS. 1A and 1B depict a system 100 including one or more leading-edge droop actuation systems, which indicates that in some implementations the system 100 includes a single leading-edge droop actuation system 108 and in other implementations the system 100 includes multiple leading-edge droop actuation systems 108. For ease of reference herein, such features are generally introduced as "one or more" features, and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIGS. 1A and 1B depict an example of a system 100 that includes an aircraft 102 that has a wing 104 (e.g., a first wing) coupled to a first side of a fuselage and a wing 106 (e.g., a second wing) coupled to a second side of the fuselage. Each of the wings 104, 106 is configured to include a leading-edge droop actuation system 108, 110. In the implementation depicted in FIGS. 1A and 1B, two wings 104, 106 are depicted with each of the wings 104, 106 including a leading-edge droop actuation system 108, 110, but in other implementations, a different number (e.g., 3, 4, 5, or some other number) of wings 104, 106 are coupled to the aircraft 102 and a different number (e.g., 1, 3, 4, 5, or some other number) of leading-edge droop actuation systems 108, 110 are coupled to the wings 104, 106. While the leading-edge droop actuation system 108 is illustrated in FIGS. 1A and 1B and discussed below it more detail, it should be noted that the leading-edge droop actuation system 110 is configured to include a similar configuration as that of the leading-edge droop actuation system 108.

The leading-edge droop actuation system 108, as illustrated in FIGS. 1A and 1B, include a leading-edge aerodynamic surface 112 coupled to the front of the wing 104. The leading-edge droop actuation system 108 also includes an actuator 114 disposed within the wing 104 and coupled to the leading-edge aerodynamic surface 112 via a linkage system as described in more detail below. The actuator 114 includes a cap end head coupled to a support bracket 126. The support bracket 126 is coupled to an inner surface of a lower wing skin 140 of the wing 104. The actuator 114 further includes a body, which includes one or more piston seals, a piston rod, and one or more rod seals. The actuator 114 also includes a connector that is configured to connect to a hydraulic supply line of a hydraulic system. In a particular aspect, the actuator 114 is a linear actuator. Further, the actuator can be an electric actuator, a hydraulic actuator, a pneumatic actuator, a mechanical actuator, or a piezoelectric actuator. The actuator 114 is configured to have an orientation that provides a linear motion in a direction along a length of the wing 104, 106. This particular orientation of the actuator provides additional integration space routing of systems within the wing 104, 106.

The linkage system includes a bell crank 122 and links 124 and 142. The link 142 is coupled to the bell crank 122 and to the link 124. The link 124 is coupled to the leading-edge aerodynamic surface 112. The link 124 may be a bracket, such as a clevis bracket or another bracket that is suitable to be coupled to the leading-edge aerodynamic surface 112 and coupled to the link 142. The bell crank 122 includes a lever or rocker having two arms meeting at a pivot at an angle and is used to transmit motion between two parts meeting at an angle. For example, a first lever of the bell crank 122 is coupled to the piston rod (e.g., translating side) of the actuator 114 or to a cap end head of the actuator 114, and the second lever of the bell crank 122 is coupled to the link 142. When the piston rod of the actuator 114 moves from a retracted position to an extended position the first lever of the bell crank 122 rotates away from the actuator 114 and the second lever of the bell crank rotates downward toward the lower wing skin 140 of the wing 104. The rotation of the bell crank 122 causes the link 142 to apply a downward force on the link 124, which causes the leading-edge aerodynamic surface 112 to move from a retracted position 148A to a drooped position 148B. The drooped position 148B of the leading-edge aerodynamic surface 112 is configured to decrease the speed at which the aircraft 102 may stall at a given angle-of-attack position. The movement of the leading-edge aerodynamic surface 112 from a retracted position 148A to a drooped position 148B changes a camber of the wing 104, 106 without substantially changing or increasing a chord of the wing 104, 106.

The leading-edge droop actuation system 108 includes two or more hinge systems 116, 118. Each of the hinge systems 116, 118 is coupled to the leading-edge aerodynamic surface 112 and configured to rotate about a fixed axis 120 internal to the wing 104 to move the leading-edge aerodynamic surface 112 between the retracted position 148A and the drooped position 148B. Each of the two or more hinge systems 116, 118 comprises one or more hinge arms 128, 130, 144, 146 having one or more multi-point attachments. Each of the multi-point attachments is coupled to a link 132, 134, 136, 138 (e.g., bracket). The links 132, 134, 136, 138 are coupled to an interior surface of the leading-edge aerodynamic surface 112. In the implementation depicted in FIGS. 1A and 1B, two hinge systems 116, 118 are coupled to the leading-edge aerodynamic surface 112, but in other implementations, a different number (e.g., 1, 3, 4, 5, or some other number) of hinge systems 116, 118 are coupled to the leading-edge aerodynamic surface 112.

In some implementations, the hinge system 116 includes two or more hinge arms 128, 144. The hinge arm 128 is coupled to the link 132 and the hinge arm 144 is coupled to the link 134. Each of the links 132, 134 is coupled to the leading-edge aerodynamic surface 112. The links 132, 134 may be a bracket, such as a clevis bracket or other suitable bracket to be coupled to the leading-edge aerodynamic surface 112 and coupled to the hinge arms 128, 144. In the implementation depicted in FIGS. 1A and 1B, two hinge arms 128, 144 are used, but in other implementations, a different number (e.g., 1, 3, 4, 5, or some other number) of hinge arms 128, 144 are used and coupled to the leading-edge aerodynamic surface 112 via the links 132, 134.

The hinge system 118 includes two or more hinge arms 130, 146. The hinge arm 130 is coupled to the link 136, and the hinge arm 146 is coupled to the link 138. Each of the links 136 and 138 is coupled to the leading-edge aerodynamic surface 112. The links 136, 138 may be a bracket, such as a clevis bracket or other bracket suitable to be coupled to the leading-edge aerodynamic surface 112 and coupled to the hinge arms 130, 146. In the implementation depicted in FIGS. 1A and 1B, two hinge arms 130, 146 are used, but in other implementations, a different number (e.g., 1, 3, 4, 5, or some other number) of hinge arms 130, 146 are used and coupled to the leading-edge aerodynamic surface 112 via the links 136, 138.

While not depicted in FIGS. 1A and 1B, the wing 104, 106 is configured to include a top surface that is coupled to the fuselage of the aircraft 102. The wing 104, 106 is also configured to include a spar. The spar is configured to carry flight loads and transfers them to the body of the aircraft 102. The wing 104, 106 is further configured to include one or more stringers. The one or more stringers are configured for transferring the aerodynamic loads acting on the skin onto one or more ribs and spar. The one or more ribs are configured to transverse structural members attached to one or more spars and stringers to make up the framework of the wing. The one or more ribs are configured to keep the cross-sectional shape of the wing 104, 106 and transmit the load from the skin and stringers to the spars. The skin is configured to carry part of the flight and ground loads in combination with the spar and the one or more ribs.

By using the techniques and systems described herein, the leading-edge droop actuation system 108, 110 has the technical advantages of improving airflow at high angles of attack to prevent stalling. In addition, the leading-edge droop actuation system 108, 110 has the technical advantages of providing additional integration space for wing and propulsion system routing within the wing.

Figure 2:
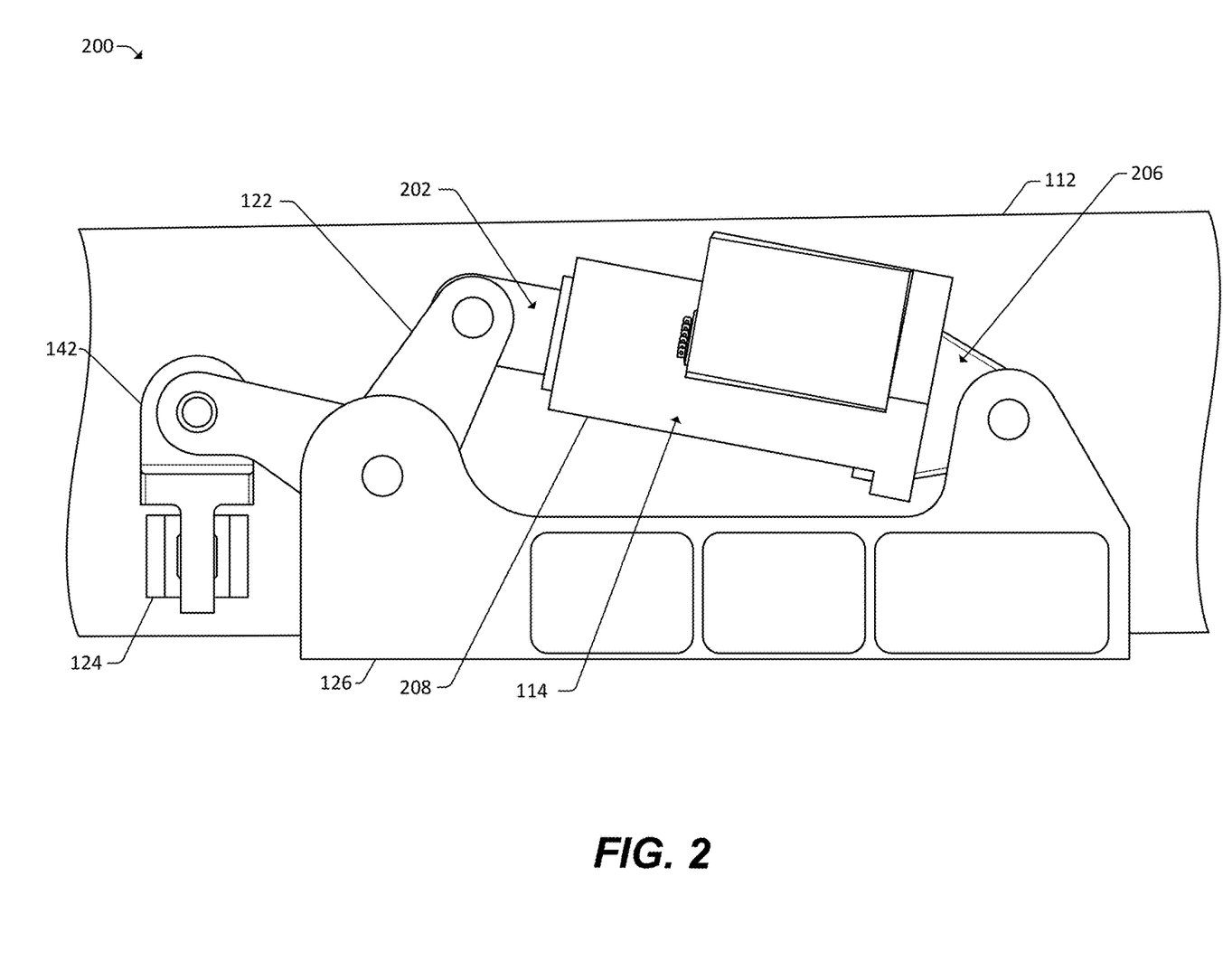

FIG. 2 is a particular diagram 200 that illustrates a side view of one or more components of the leading-edge droop actuation system 108, 110. The leading-edge droop actuation system 108, 110 is configured to include the leading-edge aerodynamic surface 112 coupled to the front of the wing 104, 106.

The leading-edge droop actuation system 108 includes the actuator 114 disposed within the wing 104 and coupled to the leading-edge aerodynamic surface 112 via the linkage system. The actuator 114 includes a cap end head 206 coupled to the support bracket 126. The support bracket 126 is coupled to the inner surface of the lower wing skin 140 of the wing 104. The actuator 114 further includes a body 208 that includes one or more piston seals, a piston rod 202, electrical components and/or connections, hydraulic connections, one or more rod seals, or a combination thereof. The piston rod 202 is coupled to the bell crank 122. The hydraulic connections are configured to connect to a hydraulic supply line of the hydraulic system. The hydraulic system is configured to provide energy to move the piston rod 202 from a retracted position to an extended position. In a particular aspect, the actuator 114 is a linear actuator. Further, the actuator can be an electric actuator, a hydraulic actuator, a pneumatic actuator, or a piezoelectric actuator. The actuator 114 is configured to have an orientation that provides a linear motion in a direction along the length of the wing 104. This particular orientation of the actuator provides additional integration space routing of systems within the wing 104, 106. In other implementations, the cap end head 206 is coupled to the bell crank 122 and the piston rod 202 is coupled to the support bracket 126.

The linkage system includes the bell crank 122 and the links 124 and 142. The link 142 is configured to couple the bell crank 122 to the link 124. The link 124 is coupled to the leading-edge aerodynamic surface 112. The link 124 may be a bracket, such as a clevis bracket or another bracket that is suitable to be coupled to the leading-edge aerodynamic surface 112 and coupled to the link 142. The bell crank 122 includes a lever or rocker having two arms meeting at a pivot at an angle and is used to transmit motion between two parts meeting at an angle. For example, a first lever of the bell crank 122 is coupled to the piston rod 202 of the actuator 114 or the cap end head 206 of the actuator 114, and the second lever of the bell crank 122 is coupled to the link 142. When the piston rod 202 of the actuator 114 moves from a retracted position to an extended position the first lever of the bell crank 122 rotates away from the actuator 114 and the second lever of the bell crank rotates downward toward the lower wing skin 140 of the wing 104. The rotation of the bell crank 122 causes the link 142 to apply a downward force on the link 124, which causes the leading-edge aerodynamic surface 112 to move from a retracted position 148A to a drooped position 148B. The drooped position 148B of the leading-edge aerodynamic surface 112 is configured to decrease a stall speed of the aircraft 102 during a high angle of attack operation of the aircraft 102. The movement of the leading-edge aerodynamic surface 112 from a retracted position 148A to a drooped position 148B changes a camber of the wing 104, 106 without substantially changing or increasing a chord of the wing 104, 106.

Figure 3:
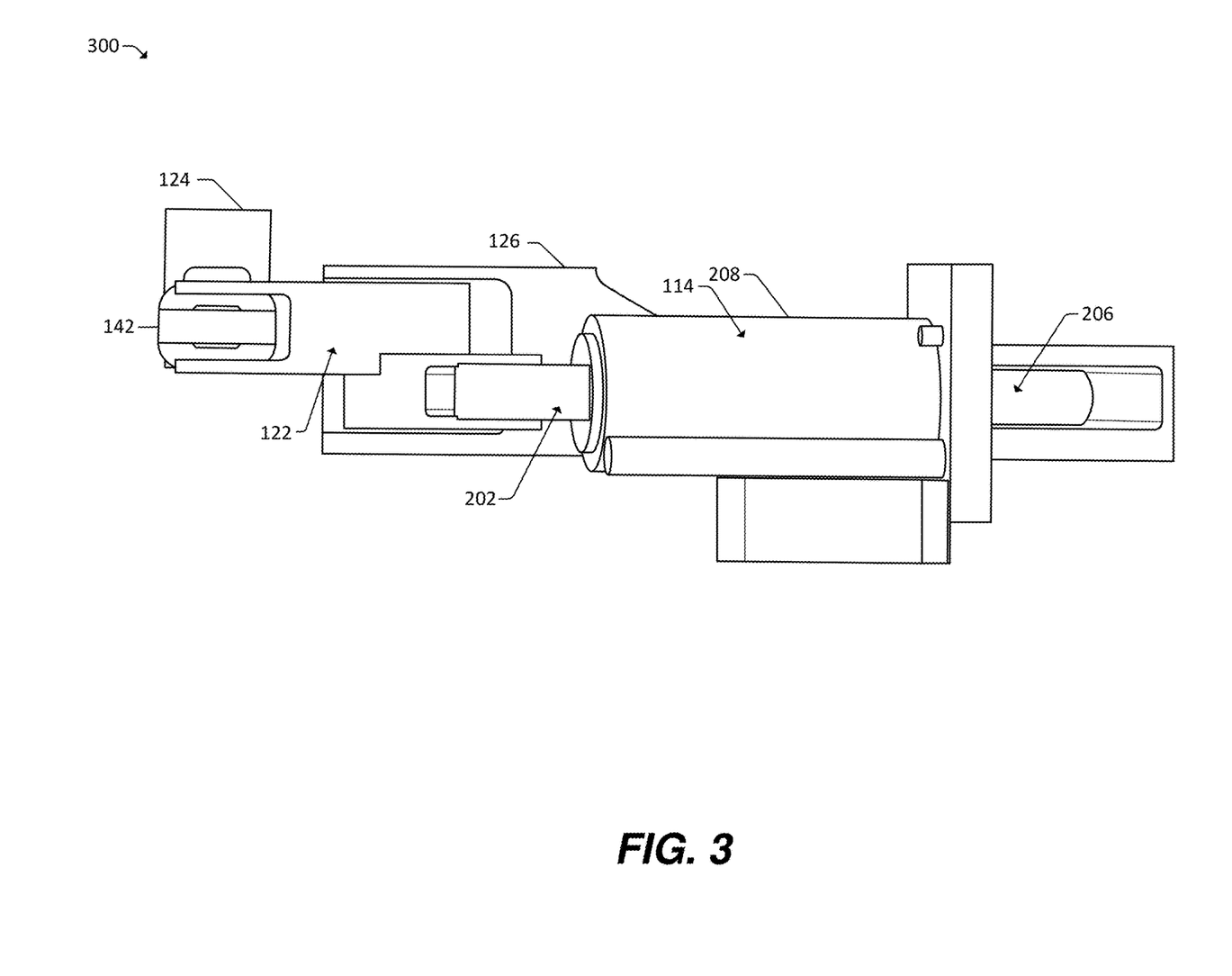

FIG. 3 is a particular diagram 300 that illustrates a top view of one or more components of the leading-edge droop actuation system 108, 110. The leading-edge droop actuation system 108, 110 includes the leading-edge aerodynamic surface 112 coupled to the front of the wing 104.

The leading-edge droop actuation system 108 includes the actuator 114 disposed within the wing 104 and coupled to the leading-edge aerodynamic surface 112 via the linkage system. The actuator 114 includes a cap end head 206 coupled to a support bracket 126. The support bracket 126 is coupled to the inner surface of the lower wing skin 140 of the wing 104. The actuator 114 further includes a body 208 that includes one or more piston seals, a piston rod 202, electrical components and/or connections, hydraulic connections, one or more rod seals, or a combination thereof. The piston rod 202 is coupled to the bell crank 122. The hydraulic connections are configured to connect to a hydraulic supply line of the hydraulic system. The hydraulic system is configured to provide energy to move the piston rod 202 from a retracted position to an extended position. The actuator 114 may be a linear actuator. Further, the actuator can be an electric actuator, a hydraulic actuator, a pneumatic actuator, or a piezoelectric actuator. The actuator 114 is configured to have an orientation that provides a linear motion in a direction along the length of the wing 104. This particular orientation of the actuator provides additional integration space routing of systems within the wing 104, 106. In other implementations, the cap end head 206 is coupled to the bell crank 122 and the piston rod 202 is coupled to the support bracket 126.

The linkage system includes the bell crank 122 and the links 124 and 142. The link 142 is configured to couple the bell crank 122 to the link 124. The link 124 is coupled to the leading-edge aerodynamic surface 112. The link 124 may be a bracket, such as a clevis bracket or another bracket that is suitable to be coupled to the leading-edge aerodynamic surface 112 and coupled to the link 142. The bell crank 122 includes a lever or rocker having two arms meeting at a pivot at an angle and is used to transmit motion between two parts meeting at an angle. For example, a first lever of the bell crank 122 is coupled to the piston rod 202 of the actuator 114 or the cap end head 206 of the actuator 114, and the second lever of the bell crank 122 is coupled to the link 142. When the piston rod 202 of the actuator 114 moves from a retracted position to an extended position the first lever of the bell crank 122 rotates away from the actuator 114 and the second lever of the bell crank rotates downward toward the lower wing skin 140 of the wing 104. The rotation of the bell crank 122 causes the link 142 to apply a downward force on the link 124, which causes the leading-edge aerodynamic surface 112 to move from a retracted position 148A to a drooped position 148B. The drooped position 148B of the leading-edge aerodynamic surface 112 is configured to decrease a stall speed of the aircraft 102 during a high angle of attack operation of the aircraft 102. The movement of the leading-edge aerodynamic surface 112 from a retracted position 148A to a drooped position 148B changes a camber of the wing 104, 106 without substantially changing or increasing a chord of the wing 104, 106.

Figure 4:
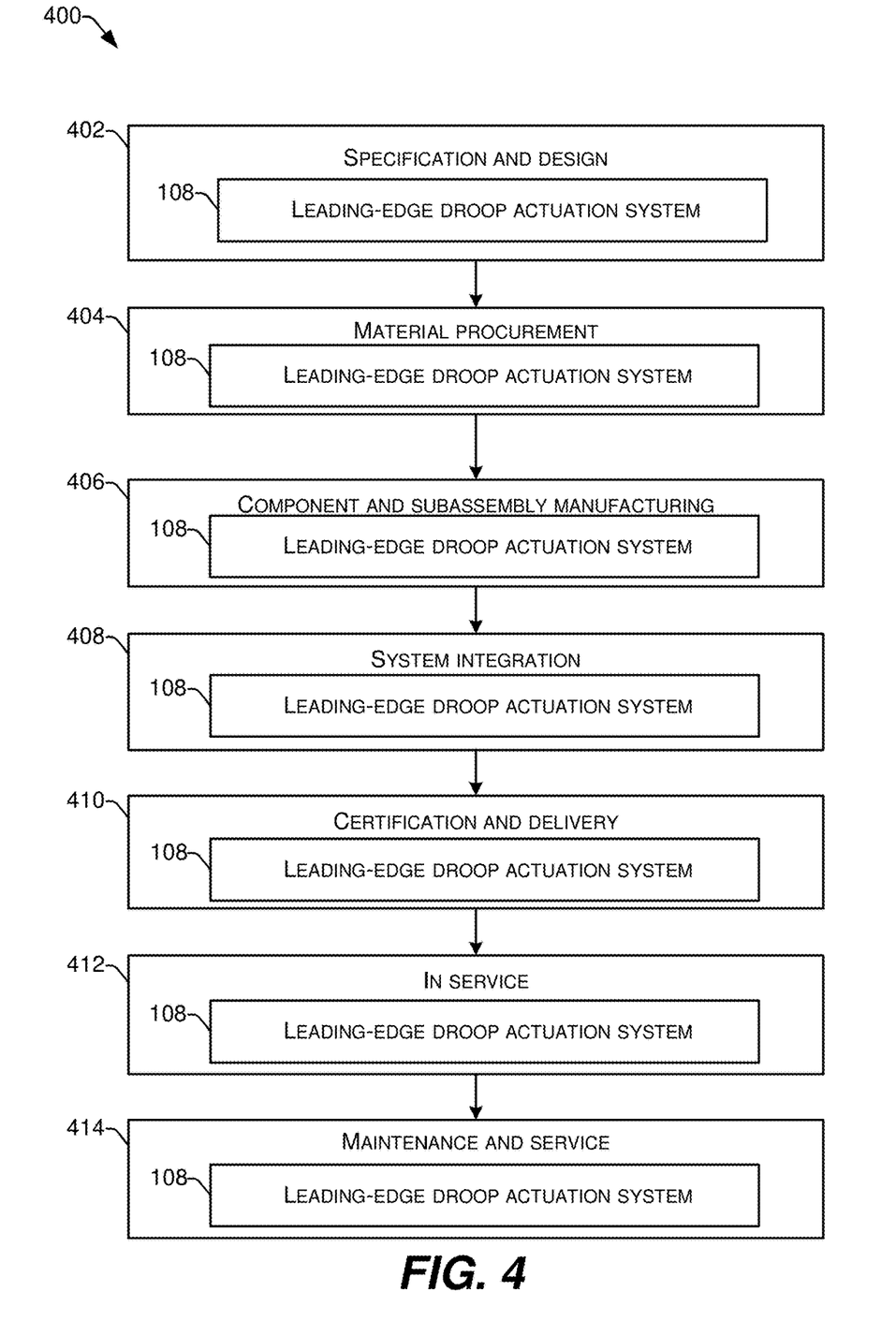

FIG. 4 is a flowchart illustrating an example 400 of a life cycle of an aircraft 102 that includes the leading-edge droop actuation system 108 of FIGS. 1A and 1B. During pre-production, the exemplary method 400 includes, at block 402, specification and design of an aircraft 102, such as the aircraft 102 described with reference to FIGS. 1A and 1B. During specification and design of the aircraft 102, the method 400 may include specification and design of the leading-edge droop actuation system 108. At block 404, the method 400 includes material procurement, which may include procuring materials for the leading-edge droop actuation system 108.

During production, the method 400 includes, at block 406, component and subassembly manufacturing and, at block 408, system integration of the aircraft 102. For example, the method 400 may include component and subassembly manufacturing of the leading-edge droop actuation system 108 and system integration of the leading-edge droop actuation system 108. At block 410, the method 400 includes certification and delivery of the aircraft 102 and, at block 412, placing the aircraft 102 in service. Certification and delivery may include certification of the leading-edge droop actuation system 108 to place the leading-edge droop actuation system 108 in service. While in service by a customer, the aircraft 102 may be scheduled for routine maintenance and service (which may also include modification, reconfiguration, refurbishment, and so on).

At block 414, the method 400 includes performing maintenance and service on the aircraft 102, which may include performing maintenance and service on the leading-edge droop actuation system 108.

Each of the processes of the method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle. A particular example of a vehicle is an aircraft 500 as shown in FIG. 5.

Figure 5:
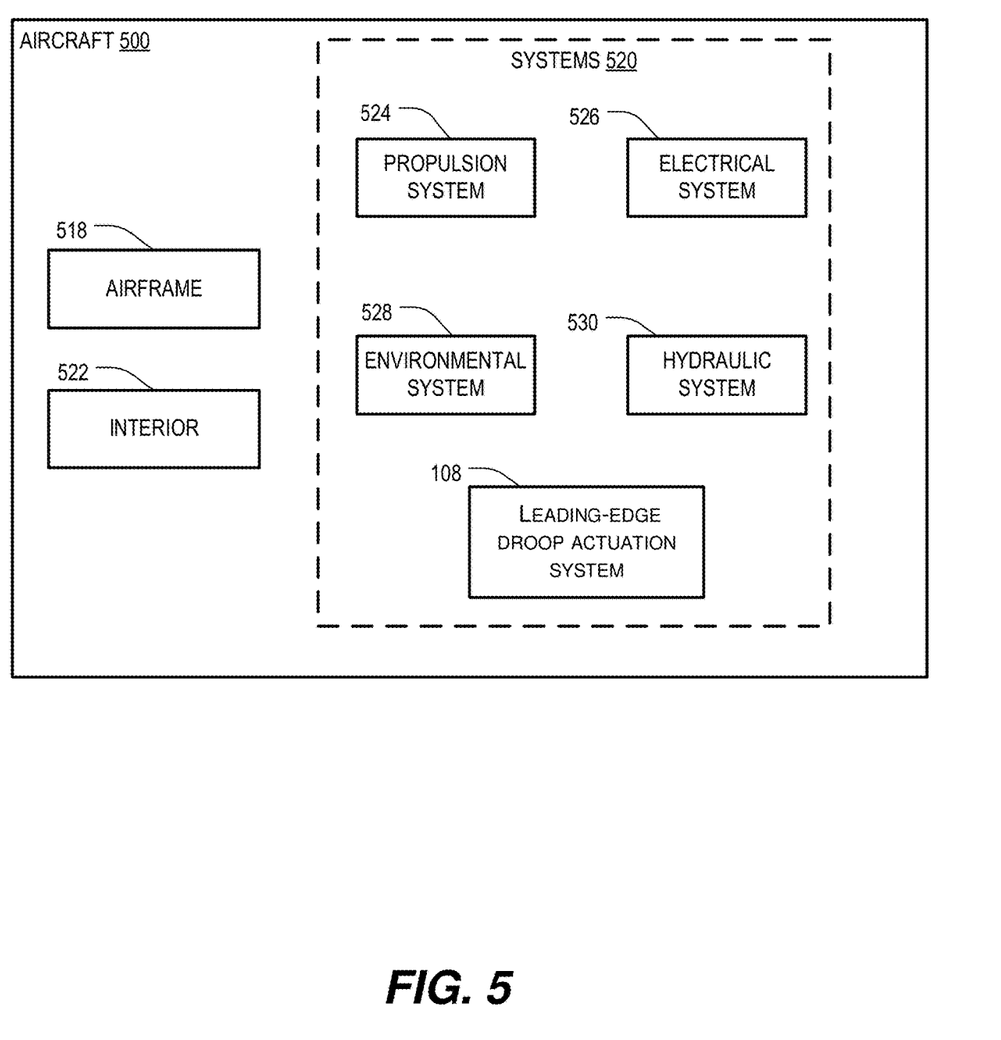

In the example of FIG. 5, the aircraft 500 includes an airframe 518 with a plurality of systems 520 and an interior 522. Examples of the plurality of systems 520 include one or more of a propulsion system 524, an electrical system 526, an environmental system 528, a hydraulic system 530, and the leading-edge droop actuation system 108. Any number of other systems may be included.

In the example of FIG. 5, the aircraft 500 includes the leading-edge droop actuation system 108 in accordance with one or more aspects of the disclosure (as described in FIGS. 1-3). The leading-edge droop actuation system 108 is included in the airframe 518. In one example, the leading-edge droop actuation system 108 is coupled to the wing 104 of the aircraft 500.

Particular aspects of the disclosure are described below in sets of interrelated Examples:

According to Example 1, an aircraft includes a wing and a leading-edge aerodynamic surface coupled to the wing. An actuator is disposed within the wing and coupled to the leading-edge aerodynamic surface via a linkage system. Two or more hinge systems are coupled to the leading-edge aerodynamic surface and configured to rotate about a fixed axis internal to the wing to move the leading-edge aerodynamic surface between a retracted position and a drooped position.

Example 2 includes the aircraft of Example 1, wherein the actuator comprises a linear actuator.

Example 3 includes the aircraft of Example 1 or Example 2, wherein the actuator has an orientation that provides a linear motion in a direction along a length of the wing.

Example 4 includes the aircraft of any of Examples 1 to Example 3, wherein the linkage system comprises a bell crank and a link.

Example 5 includes the aircraft of Example 4, wherein the link is coupled to a clevis bracket.

Example 6 includes the aircraft of Example 4 or Example 5, wherein the clevis bracket is coupled to the leading-edge aerodynamic surface.

Example 7 includes the aircraft of any of Example 1 to Example 6, wherein each of the two or more hinge systems comprises a hinge arm configured to have a multi-point attachment, wherein each multi-point attachment is coupled to a bracket, wherein the bracket is coupled to the leading-edge aerodynamic surface.

Example 8 includes the aircraft of any of Example 1 to Example 7, wherein movement of the leading-edge aerodynamic surface changes a camber of the wing without increasing a chord of the wing.

Example 9 includes the aircraft of any of Example 1 to Example 8, wherein the drooped position of the leading-edge aerodynamic surface is configured to decrease a stall speed of the aircraft during a high angle of attack operation of the aircraft.

Example 10 includes the aircraft of any of Example 1 to Example 9, wherein the actuator comprises a hydraulic actuator.

According to Example 11, a leading-edge droop actuation system includes an actuator configured to be disposed within a wing of an aircraft, wherein the actuator is configured to be coupled to a leading-edge aerodynamic surface of the aircraft via a linkage system; and two or more hinge systems configured to be coupled to the leading-edge aerodynamic surface to enable rotation about a fixed axis internal to the wing to move the leading-edge aerodynamic surface between a retracted position and a drooped position.

Example 12 includes the leading-edge droop actuation system of Example 11, wherein the actuator is a linear actuator.

Example 13 includes the leading-edge droop actuation system of Example 11 or Example 12, wherein the actuator is further configured to have an orientation that provides a linear motion in a direction along a length of the wing.

Example 14 includes the leading-edge droop actuation system of any of Example 11 to Example 13, wherein the linkage system comprises a bell crank and a link.

Example 15 includes the leading-edge droop actuation system of Example 14, wherein the link is configured to be coupled to a clevis bracket.

Example 16 includes the leading-edge droop actuation system of Example 15, wherein the clevis bracket is configured to be coupled to the leading-edge aerodynamic surface.

Example 17 includes the leading-edge droop actuation system of any of Example 11 to Example 16, wherein each of the two or more hinge systems comprises a hinge arm configured to have a multi-point attachment, wherein each multi-point attachment is configured to be coupled to a bracket, wherein the bracket is configured to be coupled to the leading-edge aerodynamic surface.

According to Example 18, a leading-edge droop actuation system includes a leading-edge aerodynamic surface; an actuator coupled to the leading-edge aerodynamic surface and configured to be disposed within a wing in an orientation that provides linear motion in a direction along a length of the wing; a linkage system coupled to the actuator, the linkage system including a bell crank and one or more links coupled to the actuator and to the leading-edge aerodynamic surface; and two or more hinge arms coupled to the leading-edge aerodynamic surface and configured to be coupled to pivot points of the wing to enable rotation about a fixed axis internal to the wing to move the leading-edge aerodynamic surface between a retracted position and a drooped position.

Example 19 includes the leading-edge droop actuation system of Example 18, wherein the drooped position of the leading-edge aerodynamic surface is configured to decrease a stall speed of an aircraft during a high angle of attack operation of the aircraft.

Example 20 includes the leading-edge droop actuation system of Example 18 or Example 18, wherein movement of the leading-edge aerodynamic surface is configured to changes a camber of the wing without substantially changing a chord of the wing.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:
   a wing;
   a leading-edge aerodynamic surface coupled to the wing;
   an actuator disposed within the wing and coupled to the leading-edge aerodynamic surface via a linkage system; and
   two or more hinge systems coupled to the leading-edge aerodynamic surface and configured to rotate about a fixed axis internal to the wing to move the leading-edge aerodynamic surface between a retracted position and a drooped position, wherein each of the two or more hinge systems comprises a hinge arm configured to have a multi-point attachment, wherein the multi-point attachment includes a first point of attachment coupled to a first bracket and a second point of attachment coupled to a second bracket, wherein the first bracket and the second bracket are each coupled to the leading-edge aerodynamic surface.

2. The aircraft of claim 1, wherein the actuator comprises a linear actuator.

3. The aircraft of claim 1, wherein the actuator has an orientation that provides a linear motion in a spanwise direction of the wing.

4. The aircraft of claim 1, wherein the linkage system comprises a bell crank and a link.

5. The aircraft of claim 4, wherein the link is coupled to a clevis bracket.

6. The aircraft of claim 5, wherein the clevis bracket is coupled to the leading-edge aerodynamic surface.

7. The aircraft of claim 1, wherein the drooped position of the leading-edge aerodynamic surface is configured to decrease a stall speed of the aircraft during a high angle of attack operation of the aircraft.

8. The aircraft of claim 1, wherein the actuator comprises a hydraulic actuator.

9. The aircraft of claim 1, wherein the linkage system comprises a support bracket coupled to an inner surface of a lower wing skin of the wing, wherein the actuator includes a cap end head coupled to the support bracket, and wherein a piston rod of the actuator is coupled to a bell crank to transmit linear motion of the actuator to rotational motion of the leading-edge aerodynamic surface.

10. The aircraft of claim 1, wherein the actuator has an orientation that provides linear motion in a spanwise direction of the wing, and wherein the linkage system comprises a bell crank coupled to the actuator and configured to transmit the linear motion of the actuator to rotational motion of the leading-edge aerodynamic surface.

11. A leading-edge droop actuation system comprising:
    an actuator configured to be disposed within a wing of an aircraft, wherein the actuator is configured to be coupled to a leading-edge aerodynamic surface of the aircraft via a linkage system; and
    two or more hinge systems configured to be coupled to the leading-edge aerodynamic surface to enable rotation about a fixed axis internal to the wing to move the leading-edge aerodynamic surface between a retracted position and a drooped position, wherein each of the two or more hinge systems comprises a hinge arm configured to have a multi-point attachment, wherein the multi-point attachment includes a first point of attachment coupled to a first bracket and a second point of attachment coupled to a second bracket, wherein the first bracket and the second bracket are each coupled to the leading-edge aerodynamic surface.

12. The leading-edge droop actuation system of claim 11, wherein the actuator is a linear actuator.

13. The leading-edge droop actuation system of claim 11, wherein the actuator is further configured to have an orientation that provides a linear motion in a spanwise direction of the wing.

14. The leading-edge droop actuation system of claim 11, wherein the linkage system comprises a bell crank and a link.

15. The leading-edge droop actuation system of claim 14, wherein the link is configured to be coupled to a clevis bracket.

16. The leading-edge droop actuation system of claim 15, wherein the clevis bracket is configured to be coupled to the leading-edge aerodynamic surface.

17. A leading-edge droop actuation system comprising:
    a leading-edge aerodynamic surface;
    an actuator coupled to the leading-edge aerodynamic surface and configured to be disposed within a wing in an orientation that provides linear motion in a spanwise direction of the wing;
    a linkage system coupled to the actuator, the linkage system including a bell crank and one or more links coupled to the actuator and to the leading-edge aerodynamic surface; and
    two or more hinge arms coupled to the leading-edge aerodynamic surface and configured to be coupled to pivot points of the wing to enable rotation about a fixed axis internal to the wing to move the leading-edge aerodynamic surface between a retracted position and a drooped position, wherein at least one of the two or more hinge arms is configured to have a multi-point attachment, wherein the multi-point attachment includes a first point of attachment coupled to a first bracket and a second point of attachment coupled to a second bracket, wherein the first bracket and the second bracket are each coupled to the leading-edge aerodynamic surface.

18. The leading-edge droop actuation system of claim 17, wherein the drooped position of the leading-edge aerodynamic surface is configured to decrease a stall speed of an aircraft during a high angle of attack operation of the aircraft.

19. The leading-edge droop actuation system of claim 17, wherein the one or more links comprise a first link coupled between the bell crank and a second link, and wherein the second link is coupled to the leading-edge aerodynamic surface via a clevis bracket configured to transmit downward force from the bell crank to move the leading-edge aerodynamic surface to the drooped position.

20. The leading-edge droop actuation system of claim 17, wherein the actuator is a linear actuator.

* * * * *